United States Patent [19]

Hayashi

[11] Patent Number: 5,229,504
[45] Date of Patent: Jul. 20, 1993

US005229504A

[54] PROCESS FOR PREPARING A SULFONATED CHITOSAN

[75] Inventor: Jisuke Hayashi, Sapporo, Japan

[73] Assignee: DIC-Hercules Chemicals, Inc., Tokyo, Japan

[21] Appl. No.: 754,988

[22] Filed: Sep. 6, 1991

[30] Foreign Application Priority Data

Sep. 7, 1990 [JP] Japan .................................. 2-235611

[51] Int. Cl.$^5$ ........................ C08B 37/08; C07H 5/06; A61K 31/73
[52] U.S. Cl. ..................................... 536/20; 536/55.3
[58] Field of Search .................... 536/20, 55.3; 514/55

[56] References Cited

U.S. PATENT DOCUMENTS 4,810,695  3/1989  Conti et al. ............................ 536/20
5,021,561  6/1991  Butelman ............................. 536/20

OTHER PUBLICATIONS

Chemical Abstracts, vol. 114, No. 4, issued 1991, Jan. 28 (Columbus, Ohio, U.S.A.) Fujita et al 'Sulfonated Porous Particulate Chitosan Derivatives' see p. 107, column 2, the abstract No. 26071w, Jpn. Kokai Tokkyo Zkoho JP 02,229,832 [90,229,832] 12 Sep. 1990, Appl. 89/51,091, 03 Mar. 1989; 6 pp.

Primary Examiner—Ronald W. Griffin
Assistant Examiner—Everett White
Attorney, Agent, or Firm—Stevens, Davis, Miller & Mosher

[57] ABSTRACT

There is disclosed a process for preparing a sulfonated chitosan wherein C3/C6-position hydroxyl groups are selectively sulfonated with inexpensive sulfonating agents which comprises dissolving or swelling chitosan in an acetic acid in water, regenerating chitosan with an alkaline aqueous solution, washing the regenerated chitosan with water and then with alcohol, immersing the chitosan in a polar solvent and pressing the solvent out of the same and sulfonating the chitosan with $SO_3$-DMF complex or $ClHSO_{3an}$-DMF complex in a non-polar solvent. Separation of the product can be easily effected by way of filtration and the like.

4 Claims, 7 Drawing Sheets

IR-SPECTRUM OF SULFONATED CHITOSAN

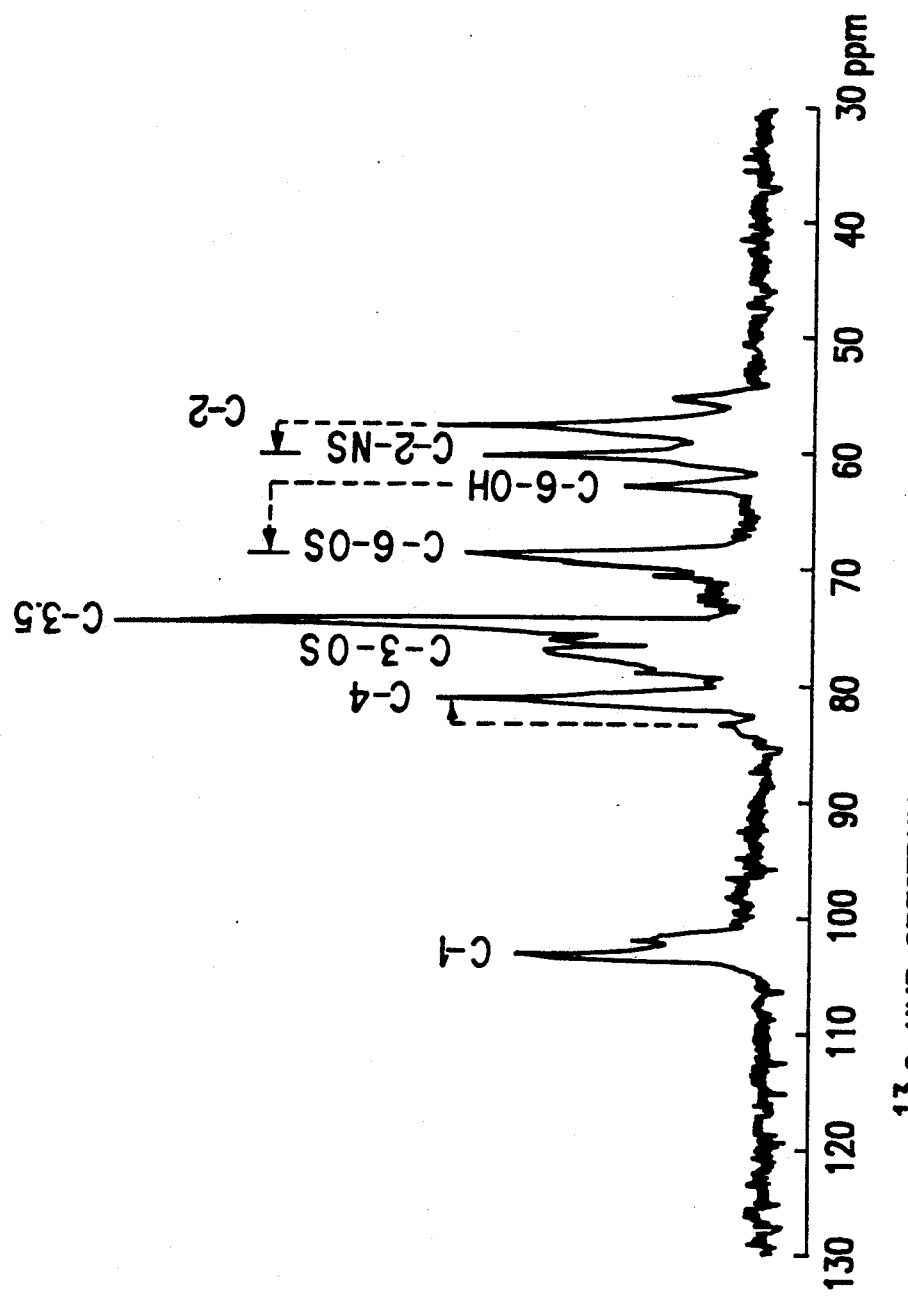

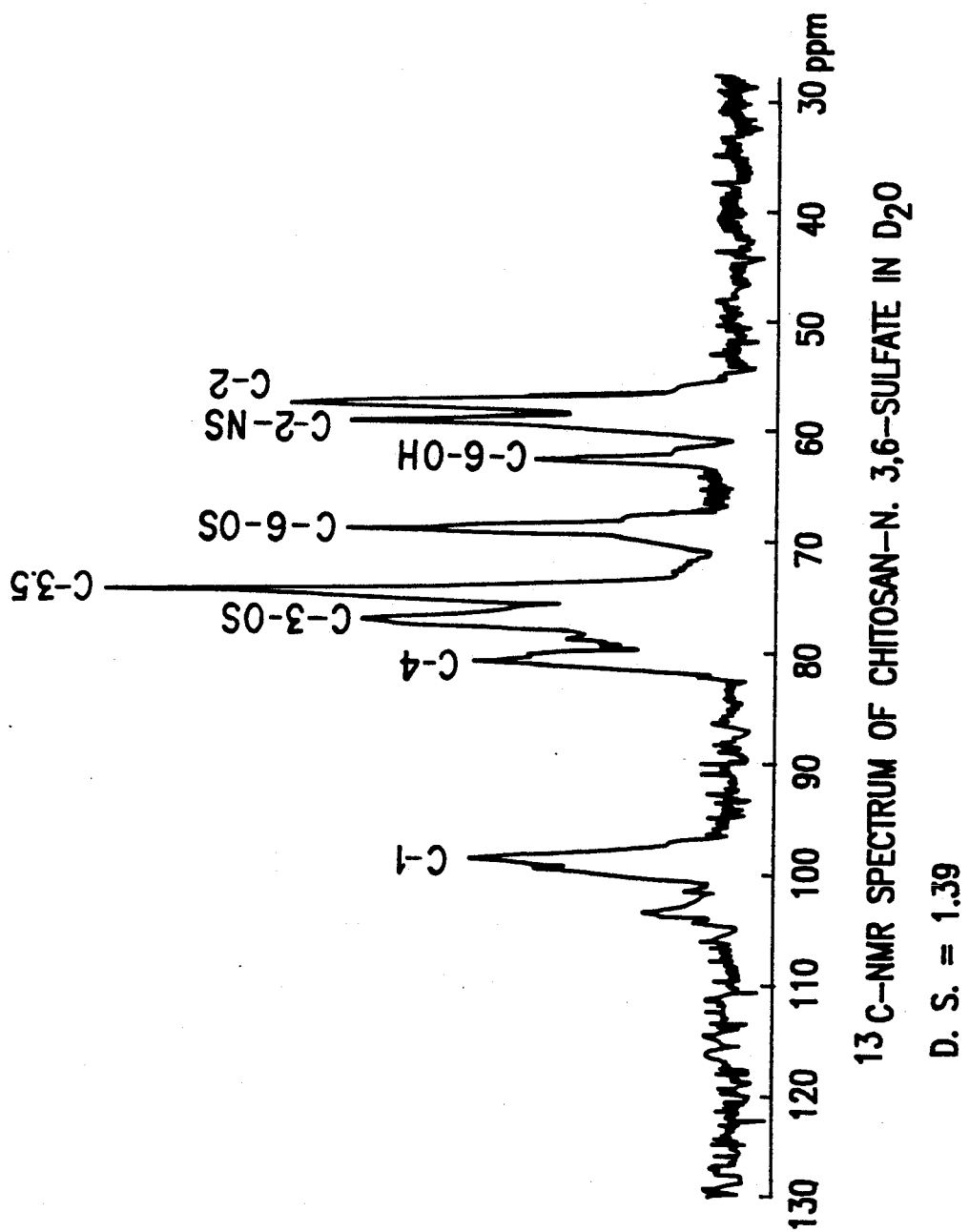

PROCESS FOR PREPARING A SULFONATED CHITOSAN

FIELD OF THE INVENTION

This invention relates to a process for preparing a sulfonated chitosan wherein the C3/C6-position hydroxyl groups are selectively sulfonated.

BACKGROUND OF THE INVENTION

Chitosan is an amino-polysaccharide derived from natural sources. It is obtained by deacetylation of chitin, which is typically contained in crustacean animals such as crabs and crayfish, insects and fungi. Chitosan has in vivo indigestible antigenicity indigestible in vivo and is useful in medical applications, for instance, as an inhibitor against the growth of tumors utilizing its macrophage activating properties and a caries-preventing agent utilizing its antimicrobial properties as well as in water treatment as a chelating agent for capturing heavy metal ions and as a cationic flocculant, enzyme immobilizing carriers and in cosmetics utilizing its good viscosity stabilizing effect, water-retentivity and lustering properties.

Sulfonated chitosan has a structure similar to that of heparin which is a typical anticoagulant and has been studied since the most earliest time among various types of chitosan derivatives due to its potentiality for use as an inexpensive anticoagulant. The relation between the structure and the activity thereof is not yet clear but it is naturally expected that the physiological activity of sulfonated chitosan will be influenced by sulfonated positions and, in fact, it is known that some sulfonated chitosans exhibit no activity, in which sulfon-groups are introduced on amino groups. The sulfon-group introduced on the amino group should be then selectively eliminated. Furthermore, when sulfonated chitosan is used utilizing its properties as a water-soluble amphoteric polymer, for instance, as a paper strength improver, flocculant, separating agent, and for immunogen carriers, water-soluble drug carriers and the like, amino-groups thereof must be free.

There are not a few reports on the sulfonation of chitosan. The most typical process among those reported comprises treating chitosan either with chlorosulfonic acid ($ClHSO_3$) in pyridine or with sulfur trioxide ($SO_3$) in dimethylformamide (DMF). Both the hydroxyl and amino groups are, however, sulfonated according to these processes (See M. L. Wolfrom, T. M. Shen Han : JACS 81,1764(1959)). Selective sulfonation of amino groups can be carried out by using pyridine/sulfur trioxide (D. T. Warner, L. L. Coleman: J. Org. Chem., 23, 1133(1958)). Russian chemists recently reported that the hydroxyl group is selectively reacted by 2-propanol/sulfuric acid or DMF/chlorosulfonic acid (L. I. Batura, G. A. Vilkhoreva, R. Noreika, L. S. Gal'braikh, Z. A. Regovin: Cell. Chem. Tech., 15, 487 (1981)). This is, however, a laboratory process and not directly applicable to commercial production since expensive chlorosulfonic acid is used therein.

The conventional process for producing sulfonated chitosan comprises dissolving pretreated chitosan in a DMF solution containing 5-10 molar equivalent of a sulfonating agent ($SO_3$-DMF complex), carrying out the sulfonating reaction under agitation for not less than 12 hours, adding a large amount of alcohol and a large amount of alkaline aqueous solution to precipitate the resulting sulfonated chitosan in which amino groups are sulfonated as well, $Na_2SO_4$ by-product and unreacted chitosan, filtering the mixture to separate a solution containing DMF, alcohol and water and a deposit containing the sulfonated chitosan, $Na_2SO_4$ and unreacted chitosan. The deposit is washed with a large amount of alcohol, dissolved in water and filtered. The $Na_2SO_4$ accompanying from the filtrate is removed by dialysis and after further purification treatments, sulfonated chitosan is finally obtained. The thus obtained chitosan contains, however, sulfonated C2-amino groups and should be subjected to a desulfonation treatment which comprises dissolving the sulfonated chitosan in a methanol/DMSO solution at 50° C. for about 1.5 hours under agitation, diluting the solution with water, dialyzing the diluted solution for 3-4 days after neutralization with an alkaline aqueous solution. Concentrating and lyophilizing steps follows and then the desired chitosan in which only hydroxyl groups are sulfonated is obtained.

The above-described conventional process is disadvantageous in an economical point of view since it requires 5-10 times as much as the theoretical amount of sulfonating agent and a large amount of solvent in the sulfonating reaction step and it also requires a neutralization step with alkali and addition of a large amount of alcohol to precipitate the dissolving sulfonated chitosan after the reaction step. Furthermore, since the sodium sulfate precipitated in a large amount along with the object compound in the neutralization step is viscous in DMF, filtration thereof is extremely troublesome and a further separation step such as dialysis is necessary in order to separate the object compound from the sodium sulfate.

The conventional process comprises many steps including a desulfonating step and is not satisfactory for practice on a commercial scale.

The object of the present invention is to provide an economical process for preparing a sulfonated chitosan with C3/C6 hydroxyl groups thereof selectively sulfonated wherein the selective sulfonation of hydroxyl groups of chitosan is achieved by an inexpensive sulfonating agent and the unreacted chitosan and the used solvent can be recycled without any refining treatment such as fractional distillation.

We conducted a research in order to solve the above-described problems and found reaction conditions that $SO_3$-DMF complex or $ClHSO_3$-DMF complex is suitable as a sulfonating agent, selected solvents which dissolve the sulfonating complexes but do not dissolve the object compounds and found pretreatment conditions and a solvent system which enables the sulfonation to proceed like a reaction in a homogeneous phase though it is, in fact, substantially a heterogeneous phase as well as quaternizing treatment conditions and a system therefor by which amino groups of chitosan are protected from sulfonation.

DISCLOSURE OF THE INVENTION

Briefly described, the present invention provides a process for preparing a sulfonated chitosan which comprises dissolving or swelling chitosan in an acetic acid aqueous solution, regenerating chitosan with an alkaline aqueous solution, washing the regenerated chitosan with water and then with alcohols, immersing the chitosan in a polar solvent and pressing the solvent out of the same and selectively sulfonating the $C_3/C_6$-position hydroxyl groups of the chitosan with $SO_3$-DMF complex or $ClHSO_3$-DMF complex in a non-polar solvent.

The object, features and advantages of the present invention will be made clear by the following description in connection with reference to the accompanying drawings in which.

Figure 1:
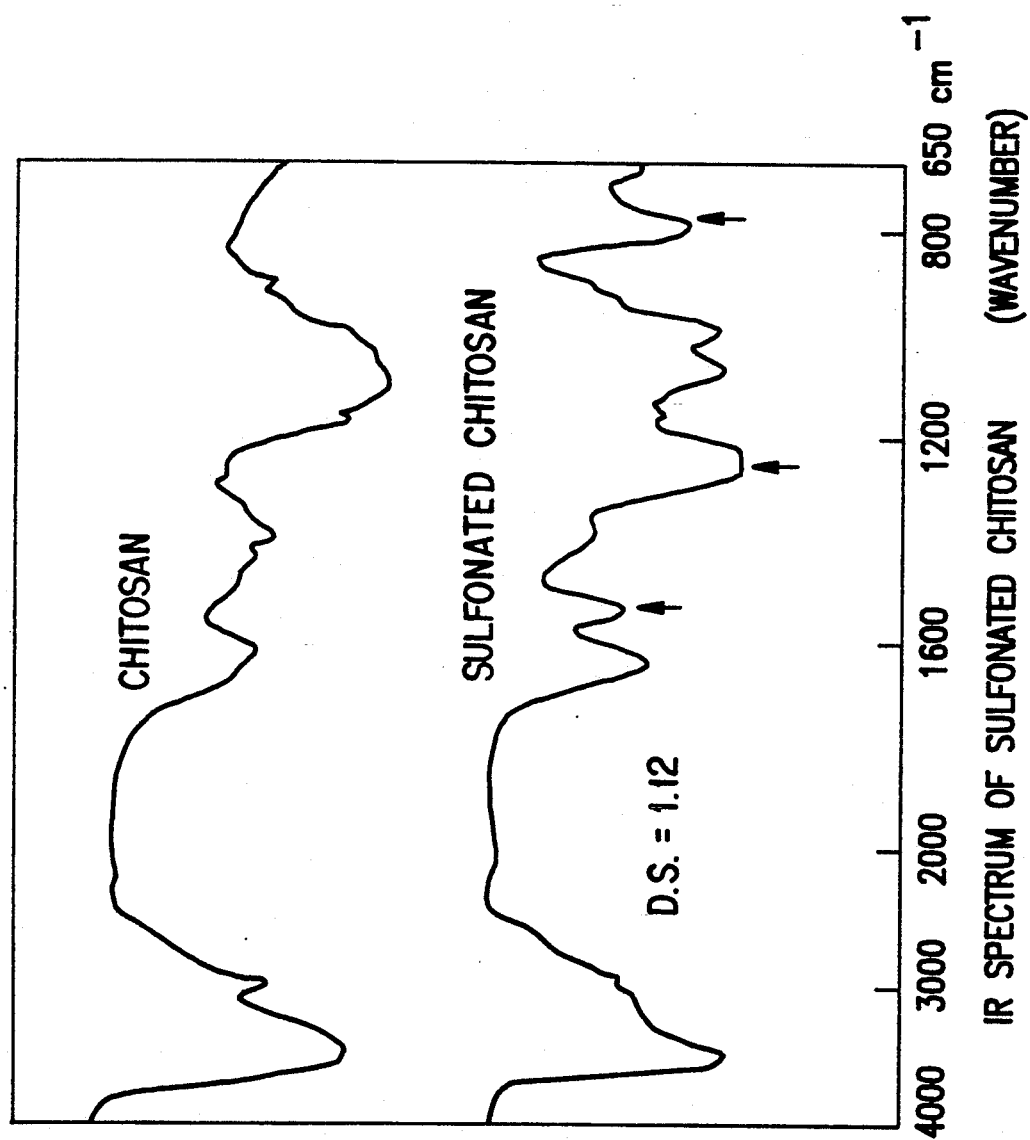
FIG. 1 is an IR chart of a sulfonated chitosan prepared in Example 1 of the present invention.

FIGS. 6 and 7 are $^{13}C$-NMR charts of the sulfonated chitosan of Comparative Example 2 after 1 hour and 20 hour reactions respectively;

According to the present invention, a pretreatment comprising the following steps must be effected (1) Dissolving chitosan in an acetic acid solution having a concentration of 1-2% or swelling chitosan to a large or extreme extent in an acetic acid solution having a concentration of 1-2%.

(2) Regenerating chitosan with an alkaline aqueous solution.

Ordinary alkalis such as NaOH, $Na_2CO_3$, KOH are usable in this step. NaOH is the most preferable. Regeneration of dissolved chitosan can be effected by neutralization-precipitation and regeneration of swollen chitosan can be effected by removing the excess liquid therefrom.

(3) Washing the thus regenerated chitosan with water and then with alcohol.

Suitable alcohols include methanol, ethanol and the like.

(4) Immersing the washed chitosan in a polar solvent and pressing the solvent out of the same to replace the alcohol with a specific polar solvent.

Polar solvents suitable for this purpose include dimethylformamide (DMF) and dimethyl sulfoxide (DMSO).

The foregoing pretreatment enables the subsequent sulfonating step to proceed like a reaction in a homogeneous phase though it is, in fact, substantially a heterogeneous phase reaction.

Without the above-described pretreatment, the heterogeneous-phase sulfonation reaction using a solvent such as benzene and toluene which does not dissolve the reaction product (sulfonated chitosan) proceeds from the surface of the solid and gives water-soluble sulfonated chitosan of only a few % of the starting material even after 24 hour reaction (See Comparative Example 1 mentioned below). In contrast, when chitosan has been subjected to the pretreatment prior to the heterogeneous-phase sulfonation reaction, sulfonated chitosan can be obtained in an about 100% yield by one-hour reaction at room temperature (See Example 1).

Furthermore, this pretreatment provides another unexpected effect that the quaternized amino groups remain unchanged after they undergo a neutralization step and the amino groups are protected from sulfonation, which enables the selective sulfonation of the C3/C6-position hydroxyl groups and eliminates the necessity of recovering of amino groups by desulfonation.

Sulfonation can be effected by using $SO_3$-DMF complex $ClHSO_3$-DMF complex as a sulfonating agent and a nonpolar solvent as a solvent, at a temperature of 0°-100° C., preferably 5°-80° C., for 0.1-48 hours under agitation.

Further selectivity in the reaction (i.e. selective sulfonation only at the C6-position or sulfonation wherein the C3/C6-positions are sulfonated in a desired ratio) can be attained by selecting these reaction conditions (See Examples 2 and 3 described bellow).

That is, we found that the selective reaction at the C6-position can be attained by conducting the reaction at a relatively high temperature and a reaction at a relatively low temperature for a long time improves the sulfonation degree at the C3-position.

$SO_3$-DMF complex can be prepared by allowing $SO_3$ to be absorbed and dissolved in DMF. $ClHSO_3$-DMF complex can be prepared by dropwise addition of chlorosulfonic acid ($ClHSO_3$) to DMF.

Preferable non-polar solvents are aromatic solvents, benzene or toluene most preferred.

In the sulfonation step of the present invention, hydroxyl groups at the C3/C6-positions are selectively sulfonated. Since the produced water-soluble sulfonated chitosan does not dissolve in a non-polar solvent, it can be separated by filtration. Furthermore, since the reaction does not involve formation of sodium sulfonate, washing of sulfonated chitosan can be easily effected by a small amount of methanol.

In addition, the filtrate can be recycled by adding $SO_3$ or $ClHSO_3$ to form DMF-complex. Thus the process reduces the amount of DMF, methanol and sulfonating agents used in the process and, therefore, brings about economical advantages.

A filtration step follows the sulfonation step and the filtrate comprising the unreacted sulfonating agent, polar and non-polar solvents is recycled and the residue comprising sulfonated chitosan (object compound) and a slight amount (not more than 1%) of the unreacted chitosan is washed with methanol or the like and redissolved in water to remove the unreacted chitosan (water-insoluble) and then purified by way of precipitation from acetone or lyophilization to give the product (sulfonated chitosan).

Since the separation and refining steps of the present invention are remarkably simple and the least amount of solvents are required compared with the corresponding steps in the conventional process, the process of the present invention is further more advantageous in the economical point of view.

Now the invention will be illustrated by way of working examples. These examples should be taken as illustrative and not in a limiting sense.

EXAMPLE 1

Pretreatment of Chitosan

Chitosan (a commercial product supplied from Tokyo Kasei Kogyo Kabushiki Kaisha) was treated with 40% NaOH for four hours at 95° C. and a refined chitosan (degree of deacetylation: 87.2%) was obtained after two-times repetition of filtration and neutralization. Five grams of the refined chitosan was dissolved in 20g of a 2% aqueous solution of acetic acid and precipitated by neutralization with a 2% NaOH aqueous solution under agitation. The regenerated chitosan was washed with water and then with methanol and thereafter immersed in DMF for 3 hours and pressed. Thus a pretreated chitosan was obtained.

Preparation of Sulfonating Agent 24.5 g of $SO_3$ was dissolved in 22.4 g of DMF to form 46.9 g of $SO_3$-DMF complex.

Synthesis of sulfonated chitosan 46.9 g of $SO_3$-DMF complex (above-described) was dissolved in 200 g of benzene. The total amount of the pretreated chitosan was added to the solution and the solution was stirred for 1 hour at room temperature. Settlings were separated by filtration, washed with a small amount of methanol, dissolved in water and filtered. The filtrate is lyophilized and 8.3 g of sulfonated chitosan was obtained. The degree of sulfonation was determined to be 1.12 (substitution degree) by elemental analysis and the yield based on chitosan was 98.4%.

Figure 2:
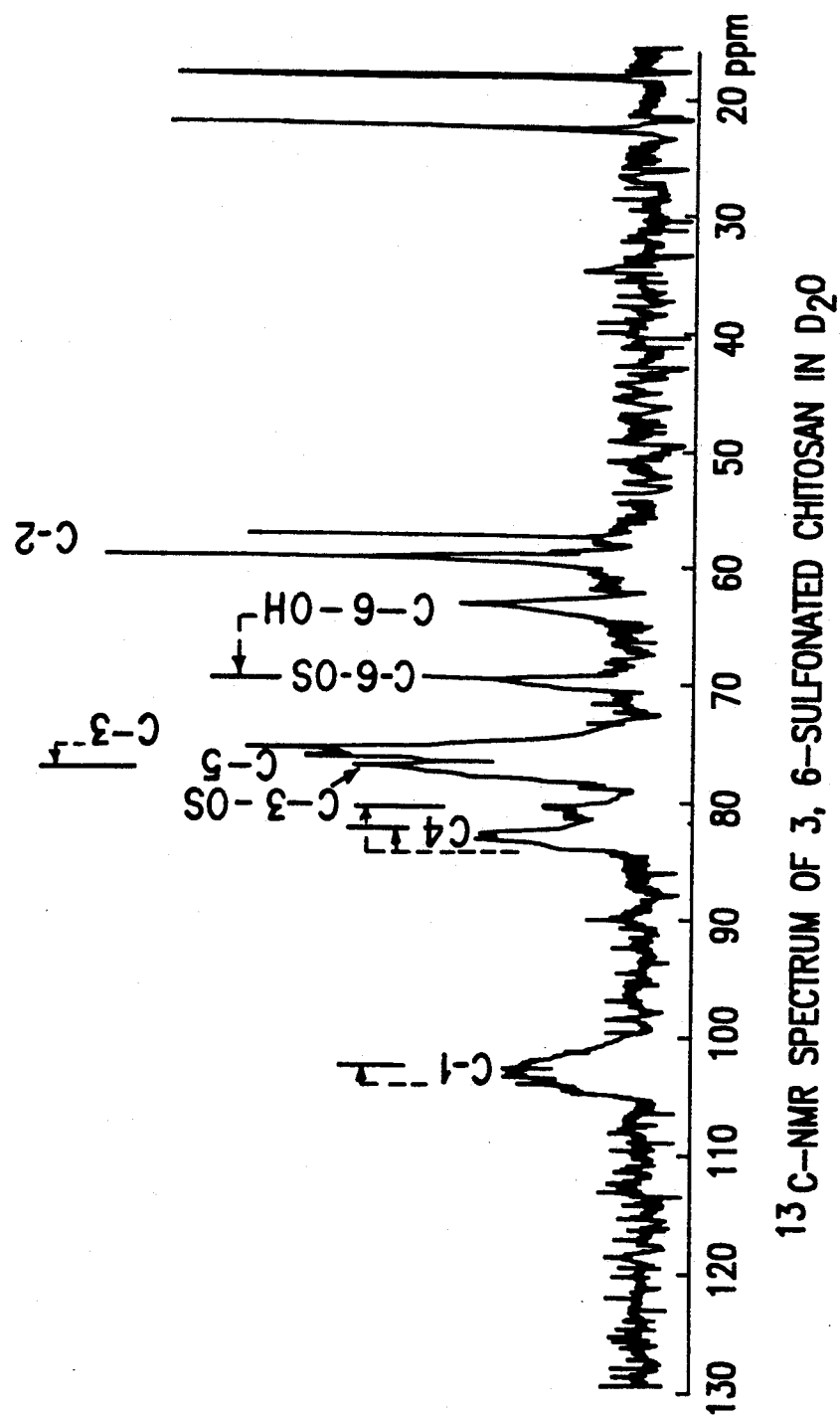
FIG. 2 is a $^{13}C$-NMR chart of the sulfonated chitosan shown in FIG. 1.

FIG. 1 is an IR-chart of the obtained chitosan and FIG. 2 is a $^{13}$C-NMR chart of the same in heavy water.

A —S=O stretching band and a C—O—S stretching-vibration band are observed at 1240 $cm^{-1}$ and 800 $cm^{-1}$ respectively, which shows that the chitosan is sulfonated.

Signals from the C3 and C6 positions of chitosan are partly shifted to the lower side of the magnetic field, which shows that some of the hydroxyl groups at the C3 and C6 positions have been sulfonated. In contrast, the signal from C2 position remains unchanged, which evidences that the —$NH_2$ group at the C2 position is not sulfonated.

EXAMPLE 2

Pretreatment of Chitosan

Pretreated chitosan was obtained in the same manner as in Example 1.

Preparation of Sulfonating agent 35.7 g of chlorosulfonic acid was added dropwise in 22.4 g of DMF below 40° C. to form 58.1 g of $ClHSO_3$-DMF complex.

Synthesis of Sulfonated Chitosan 58.1 g of $ClHSO_3$-DMF complex (above-described) was dissolved in 200 g of benzene. The total amount of the pretreated chitosan was added in the solution and stirred for 1 hour at room temperature. Settlings were separated by filtration, washed with a small amount of methanol, dissolved in water and filtered. The filtrate is lyophilized and 8.0 g of sulfonated chitosan was obtained. The degree of sulfonation was determined to be 0.98 (substitution degree) by elemental analysis and the yield based on chitosan was 99.3%.

Figure 3:
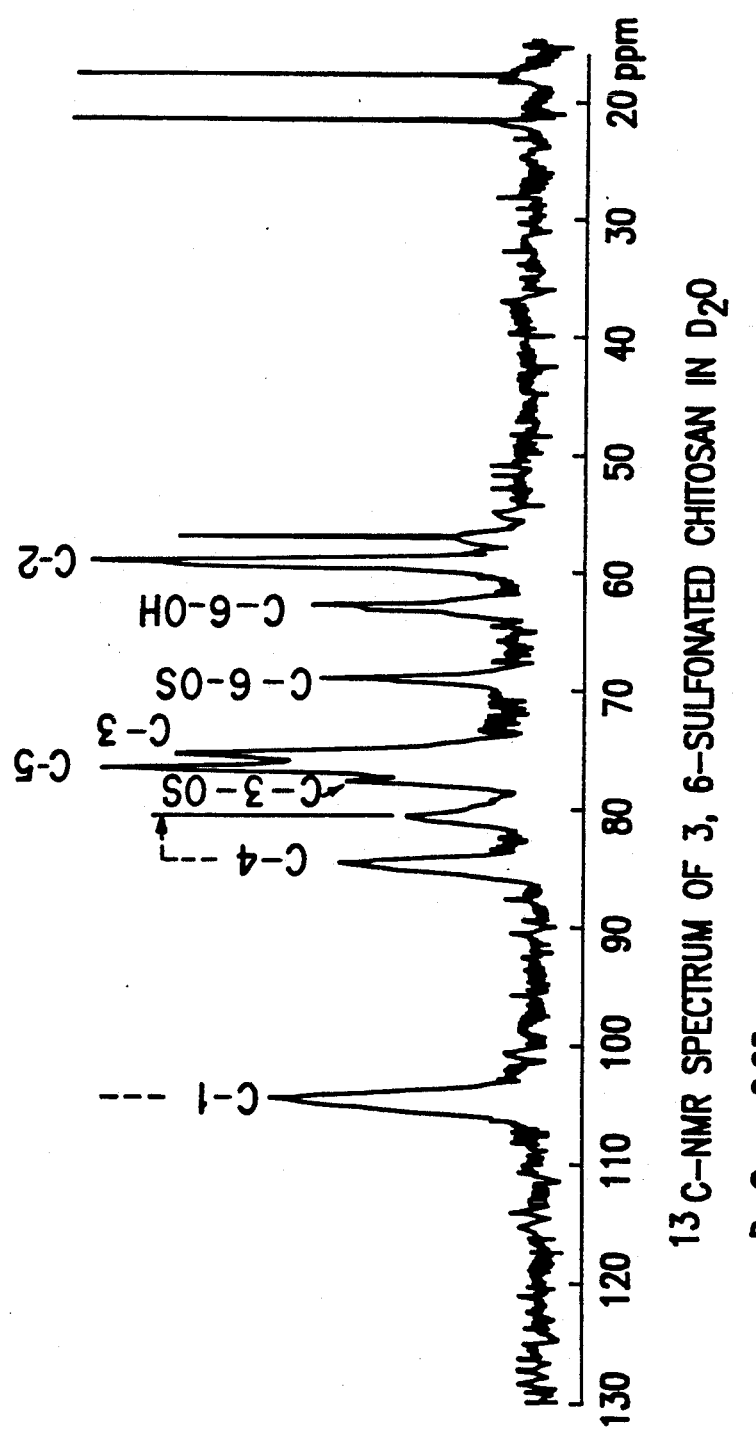
FIG. 3 is a $^{13}C$-NMR chart of a sulfonated chitosan prepared in Example 2 of the present invention.

FIG. 3 is a $^{13}$C-NMR chart of the sulfonated chitosan in heavy water. Signals from the C3 and C6 positions of chitosan are partly shifted to the lower side of the magnetic field, which shows that some of the hydroxyl groups at the C3 and C6 positions have been sulfonated. In contrast, the signal from the C2 position remains unchanged, which evidences that the —$NH_2$ group at the C2 position is not sulfonated.

EXAMPLE 3

The process of Example 2 was repeated except that the sulfonation was carried out at 50° C. for 3 hours.

Figure 4:
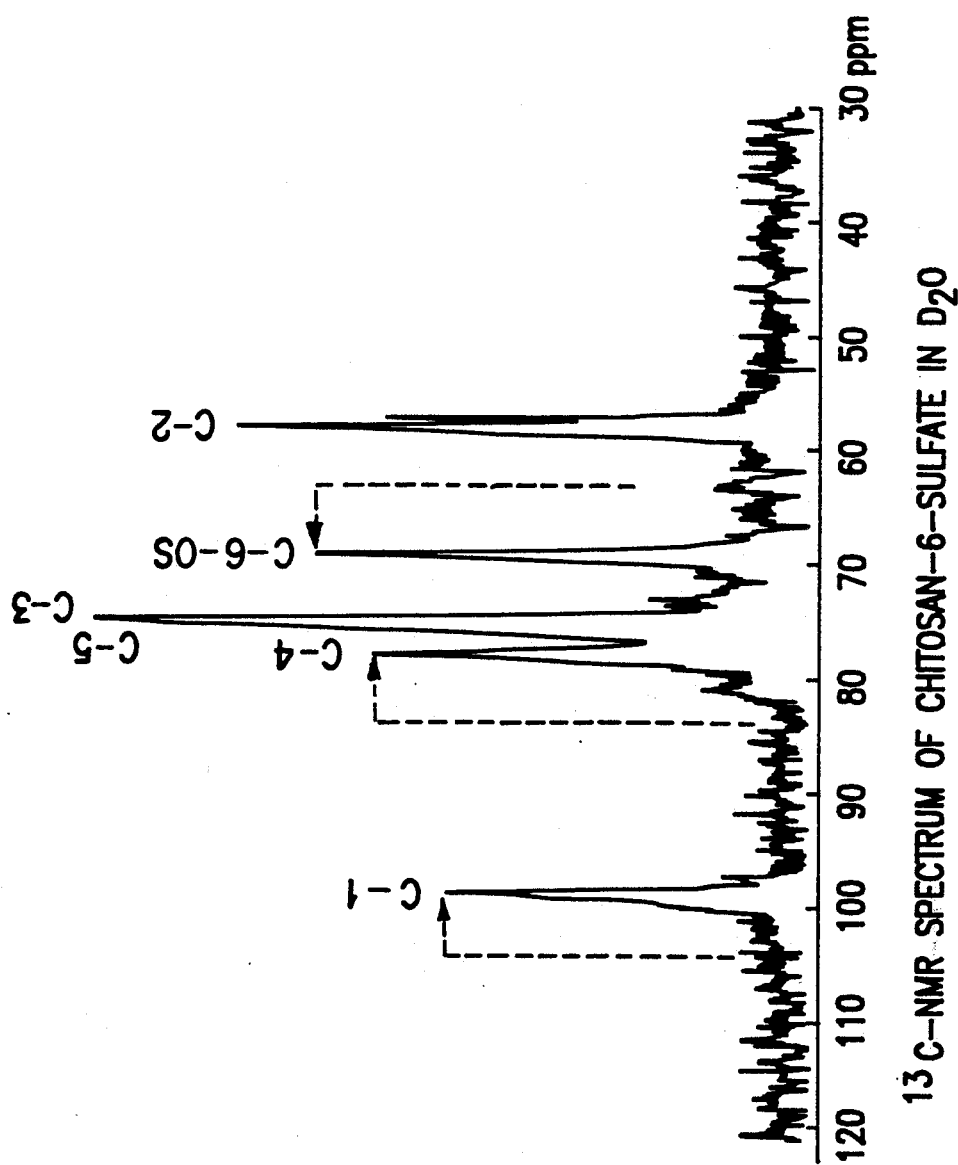
FIG. 4 is a $^{13}C$-NMR chart of a sulfonated chitosan prepared in Example 3 of the present invention.

The degree of sulfonation of the product was determined to be 0.88 (substitution degree) by elemental analysis and the yield based on chitosan was 99.5%. FIG. 4 is a $^{13}$C-NMR chart of the same. Signals from the C6 position is almost completely shifted to the lower side in the magnetic field while those from the C3 and C2 positions remain unchanged, which shows that hydroxyl groups at the C6 position have been reacted selectively.

As is clearly shown from these examples, the ratio of the reacted hydroxyl groups at the C3 and C6 positions can be controlled by varying the reaction conditions (temperature and duration of the reaction).

COMPARATIVE EXAMPLE 1

5 g of the refined chitosan prepared according to Example 1 was immersed in 100 ml of DMF at room temperature for 24 hours and thereafter pressed to remove the liquid so that the total weight was 10 g. The chitosan was subjected to the same treatment of Example 1 except that no other pretreatment was effected. After 24 hours at room temperature, only 0.2 g of water-soluble sulfonated chitosan was obtained (yield: 4%).

COMPARATIVE EXAMPLE 2

Pretreatment of Chitosan

Pretreated chitosan was obtained in the same manner as in Comparative Example 1.

Preparation of Sulfonating agent 46.9 g of $SO_3$-DMF complex was obtained in the same manner as in Example 1.

Synthesis of sulfonated chitosan

The above-described $SO_3$-DMF complex was dissolved in 200 g of DMF. The total amount of the pretreated chitosan was added in the solution and stirred for 1 hour or 20 hours at room temperature. Product was deposited by adding 240 g of methanol and 80 g of 10N NaOH and settlings were separated by filtration, washed with a large amount of methanol, dissolved in water and filtered. The filtrate was dialyzed to remove sodium sulfonate and methanol, concentrated and lyophilized and thus 5.7 g and 6.8 g of sulfonated chitosans were respectively obtained. The degree of sulfonation was determined to be 1.17 and 1.39 (substitution degree) respectively after 1 hour and 20 hours by elemental analysis and the yields calculated therefrom were 66.4% and 73.6%.

Figure 5:
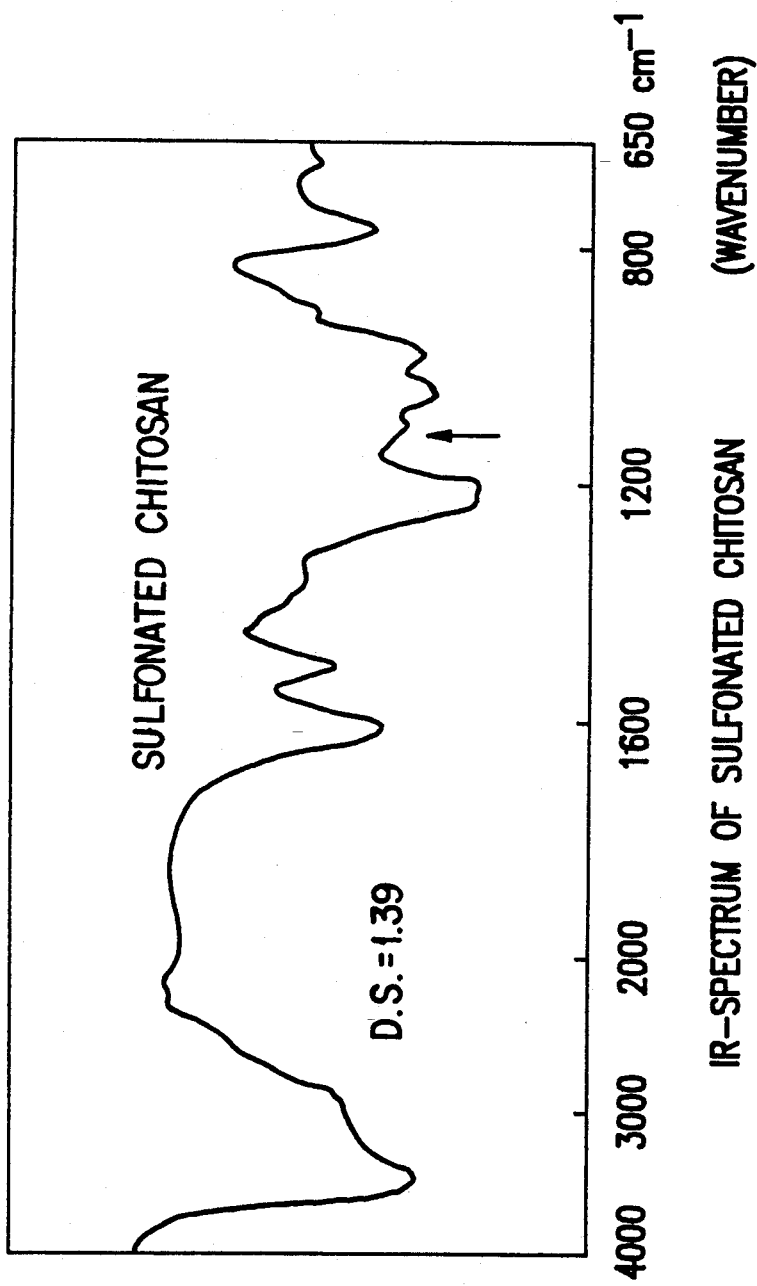
FIG. 5 is an IR chart of a sulfonated chitosan prepared in a conventional process after 20 hour reaction (Comparative Example 2)

FIG. 5 is an IR-chart of the sulfonated chitosan 20 hours after the reaction was started. FIGS. 6 and 7 are $^{13}$C-NMR charts of the sulfonated chitosan in heavy water respectively 1 hour and 20 hours after the reaction was started. Some shifts of the C2-position signal to the lower magnetic field were observed in these NMR charts, which were not observed in the NMR spectra of the sulfonated chitosan shown in FIGS. 2–4 and evidence that the amino group at the C2-position was sulfonated. C6- and C3 signals also changed partly. These evidences show that both the amino and the two hydroxyl groups were partly sulfonated. Furthermore, it is observed in the IR-spectrum shown as FIG. 5 that a C-N-S vibration band appears at 1100 $cm^{-1}$ in addition to a band suggesting the sulfonation similar to that observed in FIG. 1. This also indicates sulfonation of the amino group.

It will be apparent from the foregoing description that the combination of the use of a solvent which dissolves sulfonating agents well but does not dissolve the formed sulfonated chitosan so that the latter can be easily separated by filtration and a pretreatment comprising swelling chitosan to a large or extreme extent in the solvent so that the reaction may proceed as a homogeneous reaction and that the amino groups are protected from the sulfonation enhances the yield of sulfonation to about 100% and enables preparation of products sulfonated selectively at the C3/C6-position hydroxyl groups which can be separated from the reaction mixture by a simple filtering step and recycling of unreacted sulfonating agents and solvents merely by replenishment of the consumed amount thereof. Thus, separation of the product which has been conventionally effected by precipitation, washing, dialysis and other separating means is remarkably simplified. Necessity of a large amount of agents such as sulfonating agents, precipitating agents and washing solvents is reduced or eliminated and necessity of recovering solvents by fractional distillation and the like is also eliminated. Furthermore, selective sulfonation of hydroxyl groups can be attained with inexpensive sulfonating agents such as $SO_3$ and necessity of selective eliminating of sulfone group which has been introduced at amino groups is eliminated as well.

Accordingly, the present invention remarkably reduces the cost for producing water-soluble sulfonated chitosan and expands the field of application thereof.

We claim:

1. A process for preparing a sulfonated chitosan which comprises dissolving or swelling chitosan in an aqueous of acetic acid, regenerating chitosan with an alkaline aqueous solution, washing the regenerated chitosan with water and then with a lower alcohol, immersing the chitosan in DMF or DMSO and pressing the solvent out of the same and selectively sulfonating the $C_3$ and $C_6$ position hydroxyl groups of the chitosan with $SO_3$-DMF complex or $ClHSO_3$-DMF complex in an aromatic hydrocarbon solvent which dissolves said complex but does not dissolve chitosan.

2. The process according to claim 1, wherein the chitosan is immersed in dimethylformamide.

3. The process according to claim 1, wherein the chitosan is immersed in dimethyl sulfoxide. pg,15

4. The process according to claim 1, wherein the aromatic hydrocarbon solvent is benzene or toluene.

* * * * *